United States Patent
Song

(10) Patent No.: US 11,330,474 B2
(45) Date of Patent: May 10, 2022

(54) METHOD AND APPARATUS FOR HANDLING SENSITIVE DATA IN MACHINE TO MACHINE SYSTEM

(71) Applicants: Hyundai Motor Company, Seoul (KR); Kia Motors Corporation, Seoul (KR)

(72) Inventor: Jae Seung Song, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/917,129

(22) Filed: Jun. 30, 2020

(65) Prior Publication Data
US 2021/0007012 A1    Jan. 7, 2021

Related U.S. Application Data

(60) Provisional application No. 62/869,834, filed on Jul. 2, 2019.

(51) Int. Cl.
*H04L 29/06* (2006.01)
*H04W 4/70* (2018.01)
(Continued)

(52) U.S. Cl.
CPC .......... *H04W 28/14* (2013.01); *H04W 4/70* (2018.02); *H04W 28/0231* (2013.01); *H04W 28/26* (2013.01); *H04W 12/63* (2021.01)

(58) Field of Classification Search
CPC ....... H04W 4/70; H04W 12/02; H04W 12/03; H04W 12/63; H04W 28/0231;
(Continued)

(56) References Cited

U.S. PATENT DOCUMENTS

2013/0080774 A1* 3/2013 Combet ............... H04W 12/02
                                                  713/168
2014/0317756 A1* 10/2014 Takahashi ............ G06F 21/60
                                                  726/26
(Continued)

FOREIGN PATENT DOCUMENTS

WO    WO-2020146689 A1 *  7/2020

OTHER PUBLICATIONS

Attribute Based Access Control Policy, One M2M, TR-0050-V-0.8.1, Jul. 1, 2019, 43 pages.
(Continued)

*Primary Examiner* — Nathan S Taylor
(74) *Attorney, Agent, or Firm* — Mintz Levin Cohn and Popeo, P.C.; Peter F. Corless

(57) ABSTRACT

Disclosed herein are a method and procedure for processing protection data for protecting data privacy in an M2M system. According to an embodiment of the present disclosure, an M2M apparatus located in an M2M platform in an M2M system includes a communicator configured to transmit and receive a signal and a processor configured to control the communicator. Herein, the processor generates a resource at a resource generation request for administering data received by the communicator, generates a resource at a resource generation request for storing the data received by the communicator, determines whether the data received by the communicator are protection data, and when the data are determined as protection data, performs data processing for privacy protection.

14 Claims, 19 Drawing Sheets

(51) Int. Cl.
*H04W 28/14* (2009.01)
*H04W 28/02* (2009.01)
*H04W 28/26* (2009.01)
*H04W 12/63* (2021.01)

(58) Field of Classification Search
CPC ....... H04W 28/14; H04W 28/26; H04W 4/38; H04W 4/44; H04W 28/02; G06F 21/6254; G06F 21/62; H04L 63/0421; H04L 63/205; H04L 67/12; H04L 29/06; H04L 29/08; H04L 9/00
See application file for complete search history.

(56) References Cited

U.S. PATENT DOCUMENTS

| | | | | |
|---|---|---|---|---|
| 2016/0191295 | A1* | 6/2016 | Dong | G06F 16/95 707/741 |
| 2016/0212732 | A1* | 7/2016 | Choi | H04W 4/70 |
| 2016/0323767 | A1* | 11/2016 | Abdullah | H04W 16/18 |
| 2017/0177683 | A1* | 6/2017 | Koike | G06F 16/258 |
| 2018/0077573 | A1* | 3/2018 | Werdell | H04W 76/10 |
| 2018/0375892 | A1* | 12/2018 | Ganor | H04L 63/20 |
| 2019/0043354 | A1* | 2/2019 | Oluwafemi | G08G 1/127 |
| 2019/0333054 | A1* | 10/2019 | Cona | G06F 21/31 |
| 2020/0220919 | A1* | 7/2020 | Di Girolamo | G06F 16/9574 |
| 2021/0029492 | A1* | 1/2021 | Kersch | H04W 4/42 |

OTHER PUBLICATIONS

Vehicular Domain Enablement, One M2M, Technical Report, Jul. 13, 2019, 203 pages.
Na et al. (Jul. 2018) "Handling Privacy Data Protection Related Regulations", One M2M, 10 pages.
Sadki et al. (May 28-30, 2014) "Enhancing Privacy on Mobile Health: An Integrated Privacy Module", Fifth International Conference on Next Generation Networks and Services (NGNS), 245-250.
Song et al. (Apr. 14, 2020) "Pseudonymization and Anonymization of Privacy Data", WI-0095, OneM2M System Enhancement to Support Privacy Data Protection Regulations (eDPR), 4 pages.
Song et al. (Jul. 8, 2019) "Use Case on Data Protection Related Regulations", TR-0026 (Rcl-4), RDM-2019-0067, 4 pages.
Song et al. (Jul. 8, 2019) "Use Case on Data Protection Related Regulations", TR-0026 (Rcl-4), RDM-2019-0067R02, 4 pages.

* cited by examiner

FIG. 7B

| Before | | After | |
|---|---|---|---|
| Last Name | Credit Card | Last Name | Credit Card |
| James | 4234-5678-9128-4567 | Schmidt | 4876-5432-1987-6543 |
| Davis | 3213-4567-8901-2345 | Fowler | 3456-7890-1234-5678 |

711～ (James row)
712～ (Davis row)

FIG. 7C

| Original data | | | |
|---|---|---|---|
| | Age | Gender | Zipcode |
| 721 | 42 | Female | 53715 |
| 722 | 42 | Female | 55410 |
| 723 | 77 | male | 90210 |
| 724 | 32 | male | 02274 |
| 725 | 32 | male | 02237 |

| 2-Anonymization | | | | |
|---|---|---|---|---|
| | | Birth | Gender | Zipcode |
| 7211 | Group1 | 40-49 | Female | 5**** |
| | | 40-49 | Female | 5**** |
| 7212 | Suppressed | 77 | male | 90210 |
| 7213 | Group2 | 30-39 | male | 022** |
| | | 30-39 | male | 022** |

FIG. 7D

Original data

| | Non-protection | | protection |
|---|---|---|---|
| Age | Gender | Zipcode | Disease |
| 22 | Female | 02900 | diarrhea |
| 20 | Female | 02274 | Anemia |
| 51 | male | 53032 | diarrhea |
| 41 | male | 53001 | Flu |
| 31 | male | 02150 | Anemia |
| 39 | Female | 02585 | Flu |

731 → row 1, 732 → row 2, 733 → row 3, 734 → row 4, 735 → row 5, 736 → row 6

2-diversity

| | Non-protection | | protection |
|---|---|---|---|
| Age | Gender | Zipcode | Disease |
| 0-40 | * | 02*** | diarrhea |
| 0-40 | * | 02*** | Anemia |
| 40-80 | * | 53*** | diarrhea |
| 40-80 | * | 53*** | Flu |
| 0-40 | * | 02*** | Flu |
| 0-40 | * | 02*** | Anemia |

7311 groups rows 1-2, 7312 groups rows 3-4, 7313 groups rows 5-6

FIG. 7E

|  | Non-protection | | | protection Data | |
|---|---|---|---|---|---|
|  | Age | Gender | Zipcode | Disease | Salary |
| 741 | 0-40 | * | 02*** | Gastric ulcer | 30 |
| 742 | 0-40 | * | 02*** | Chronic gastritis | 50 |
| 743 | 40-80 | * | 53*** | Acute Gastritis | 60 |
| 744 | 40-80 | * | 53*** | diarrhea | 110 |
| 745 | 0-40 | * | 02*** | Flu | 90 |
| 746 | 0-40 | * | 02*** | Chronic gastritis | 100 | t-closeness

|  | Non-protection Data | | | protection Data | |
|---|---|---|---|---|---|
|  | Age | Gender | Zipcode | Disease | Salary |
| 7411 | 0-40 | * | 02*** | Gastric ulcer | 30 |
| 7412 | 0-40 | * | 02*** | diarrhea | 90 |
| 7413 | 40-80 | * | 53*** | Acute Gastritis | 60 |
| 7414 | 40-80 | * | 53*** | diarrhea | 110 |
| 7415 | 0-40 | * | 02*** | Chronic gastritis | 50 |
| 7416 | 0-40 | * | 02*** | Chronic gastritis | 100 |

FIG. 7F

Public Data(P)

| | Name | Zipcode | Age | Nationality | Sen |
|---|---|---|---|---|---|
| 1 | Alia | 47096 | 35 | USA | 0 |
| 2 | Ben | 47093 | 59 | Canada | 1 |
| 3 | Catarina | 47096 | 42 | USA | 1 |
| 4 | David | 47630 | 18 | Brazil | 0 |
| 5 | Euria | 47630 | 22 | Brazil | 0 |
| 6 | Franck | 47633 | 63 | Peru | 1 |
| 7 | Gray | 48973 | 33 | Spain | 0 |
| 8 | Hailey | 48972 | 47 | Bulgaria | 1 |
| 9 | Ivan | 48970 | 52 | France | 1 | protection Data(T)

| | Zipcode | Age | Nationality |
|---|---|---|---|
| 2 | 47093 | 59 | Canada |
| 3 | 47096 | 42 | USA |
| 6 | 47633 | 63 | Peru |
| 8 | 48972 | 47 | Bulgaria |
| 9 | 48970 | 52 | France |

FIG. 7G

Public Data(P)

| | Name | Zipcode | Age | Nationality | Sen |
|---|---|---|---|---|---|
| 1 | Alia | 47096 | 35 | USA | 0 |
| 2 | Ben | 47093 | 59 | Canada | 1 |
| 3 | Catarina | 47096 | 42 | USA | 1 |
| 4 | David | 47630 | 18 | Brazil | 0 |
| 5 | Euria | 47630 | 22 | Brazil | 0 |
| 6 | Franck | 47633 | 63 | Peru | 1 |
| 7 | Gray | 48973 | 33 | Spain | 0 |
| 8 | Hailey | 48972 | 47 | Bulgaria | 1 |
| 9 | Ivan | 48970 | 52 | France | 1 | protection Data(T)

| | Zipcode | Age | Nationality |
|---|---|---|---|
| 2 | 47*** | * | America |
| 3 | 47*** | * | America |
| 6 | 47*** | * | America |
| 8 | 48*** | * | Europe |
| 9 | 48*** | * | Europe |

FIG. 11

| Attribute Name | Description |
|---|---|
| privacyRegulation | Used to indicate which regulation is to be applied. An example of this attribute is gdpr (for EU) or pipa (for KR) |
| PrivacyIndication | used to indicate that this data is subject to privacy regulation |
| PrivacyProcessingRule | used to mention a technique to be used, for example, pseudonymization or anonymization |
| privacyTechniques | optionally this attribute can be used to mention about detail information such as replacement, scrambling, masking, personalized anonymization, blurring |
| privacyBlock | If parts of data contain privacy related data, this attribute can be used to identify the accurate parts of data to be handled. For example, Alice-info-3948272 contains 'Alice-info', which is data that should be anonymized. In this case, 10 characters should be anonymized |
| privacySubject | Used to indicate which parts of a resource are subject for this privacy regulation (name or data) |

1101 — privacyRegulation
1102 — PrivacyIndication
1103 — PrivacyProcessingRule
1104 — privacyTechniques
1105 — privacyBlock
1106 — privacySubject

METHOD AND APPARATUS FOR HANDLING SENSITIVE DATA IN MACHINE TO MACHINE SYSTEM

CROSS REFERENCE TO RELATED APPLICATION

The present application claims priority to a U.S. provisional application 62/869,834, filed Jul. 2, 2019, the entire contents of which are incorporated herein for all purposes by this reference.

BACKGROUND OF THE INVENTION

Field of the Invention

The present invention relates to a method and apparatus for processing protection data in a machine-to-machine (M2M) system, and more particularly, to a method and apparatus for processing protection data requiring privacy protection in order not to be exposed to an unauthorized person.

Description of the Related Art

Recently, introduction of Machine-to-Machine (M2M) system has become active. An M2M communication refers to a communication executed between machines without human intervention. M2M may refer to Machine Type Communication (MTC), Internet of Things (IoT) or Device-to-Device (D2D). In the following description, the term "M2M" is uniformly used for convenience of explanation, but the present invention is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information.

In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

The present invention provides a method and device for handling protection data in machine-to-machine system.

According to the present invention, an M2M apparatus in a machine-to-machine system may include a communicator configured to transmit and receive a signal and a processor configured to control the communicator, wherein the processor generates a resource at a resource generation request for administering data received by the communicator, generates a resource at a resource generation request for storing the data received by the communicator, determines whether the data received by the communicator are protection data, and when the data are determined as protection data, performs data processing for privacy protection.

Further, the processor stores the processed data in a resource generated at the resource generation request for storing the data.

Additionally, the processor stores the received data, as they stand, in the resource generated at the resource generation request for storing the data, and when a third-party entity requests the resource storing the received data, performs data processing.

According to the present invention, a method of operating an M2M apparatus may include receiving a resource generation request for data administration, generating a resource for data administration at the resource generation request, receiving data and a resource generation request of storing the data, generating a resource for storing the data and determining whether the received data are protection data, wherein the resource for storing the data may be <container>.

BRIEF DESCRIPTION OF THE DRAWINGS

FIGS. 7B to 7H are views showing detailed processing methods according to the present disclosure.

FIG. 11 is a view showing an attribute related to protection data in an M2M system according to the present disclosure.

DETAILED DESCRIPTION OF THE INVENTION

Figure 1:
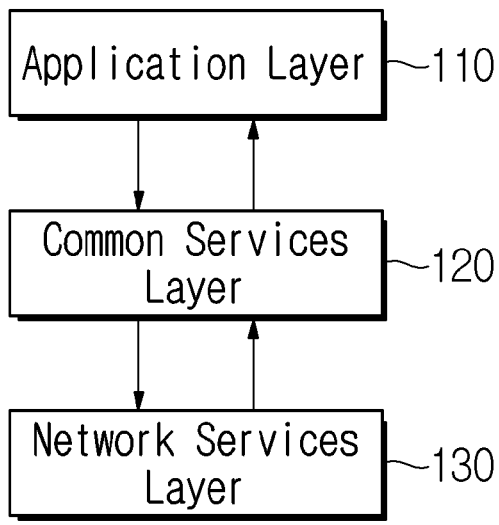
FIG. 1 is a view illustrating a layered structure of a Machine-to-Machine (M2M) system according to the present disclosure.

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various embodiments are also included in the scope of the present disclosure.

In the following description of the exemplary embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In addition, the present specification describes a network based on Machine-to-Machine (M2M) communication, and a work in M2M communication network may be performed in a process of network control and data transmission in a system managing the communication network.

In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the exemplary embodiment described above.

In addition, an M2M terminal may be fixed or have mobility. In addition, an M2M server refers to a server for M2M communication and may be a fixed station or a mobile station.

In addition, in the present specification, an entity may refer to hardware like M2M device, M2M gateway and M2M server. In addition, for example, an entity may be used to refer to software configuration in a layered structure of M2M system and is not limited to the embodiment described above.

In addition, for example, the present invention mainly describes an M2M system but is not solely applied thereto.

In addition, an M2M server may be configured to perform communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other via an M2M gateway. Herein, for example, both an M2M gateway and an M2M server may be M2M terminals and are not limited to the exemplary embodiment described above.

Further, in the present disclosure, storage may include a database. In addition, 'protection data' in the present disclosure may mean sensitive data that requires protection. For example, in the present disclosure, protection data may be used in a meaning including private data and personal data. In addition, protection data in the present disclosure may mean non-disclosure information, for example, 'unreleased information' or 'unreleased designated information' or 'unrevealed information' for any reason. In addition, protection data in the present disclosure may mean objective information that requires protection, such as 'important information' or 'major class classification information', even if it is publicly available information. In addition to the example above, protection data in the present disclosure may imply any information that is set to be protected by subjective judgment of a user or a M2M system. For example, 'vehicle related information', 'location information' and 'preference information' may also belong to the protection data in the present disclosure.

Additionally, in the present disclosure, M2M terminal may be used interchangeably with M2M apparatus and M2M device.

Additionally, in the present disclosure, a communication unit may be used interchangeably with a communicator.

Additionally, oneM2M is a de facto standards organization that was founded to develop a communal IoT service platform sharing and integrating application service infrastructure (platform) environments beyond fragmented service platform development structures limited to separate industries like energy, transportation, national defense and public service.oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Similar to an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of a Machine-to-Machine (M2M) system according to the present disclosure.

Referring to FIG. 1, a layered structure of an M2M system may include an application layer 110, a common services layer 120 and a network services layer 130. Herein, the application layer 110 may be a layer that operates based on a specific application. For example, an application may be a fleet tracking application, a remote blood sugar monitoring application, a power metering application or a controlling application. In other words, an application layer may a layer for a specific application. Herein, an entity operating based on an application layer may be an application entity (AE).

The common services layer 120 may be a layer for a common service function (CSF). For example, the common services layer 120 may be a layer configured to provide common services like data management, device management, M2M service subscription management and location service. For example, an entity operating based on the common services layer 120 may be a common service entity (CSE).

The common services layer 120 may be configured to provide a set of services that are grouped into CSFs according to functions. A multiplicity of instantiated CSFs constitutes CSEs. CSEs may interface with applications (e.g., application entities or AEs in the terminology of oneM2M), other CSEs and base networks (for example, network service entities or NSEs in the terminology of oneM2M).

The network services layer 130 may be configured to provide the common services layer 120 with services such as device management, location service and device triggering. Herein, an entity operating based on the network layer 120 may be a network service entity (NSE).

Figure 2:
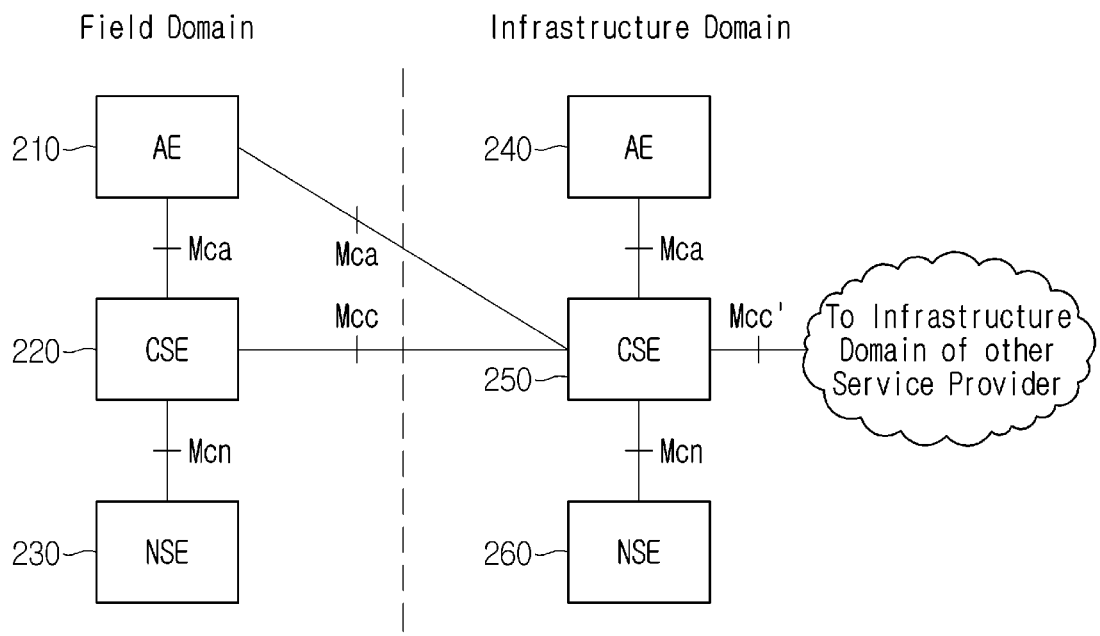
FIG. 2 is a view illustrating reference points in an M2M system according to the present disclosure.

FIG. 2 is a view illustrating reference points in an M2M system according to the present disclosure.

Referring to FIG. 2, an M2M system structure may be distinguished into a field domain and an infrastructure domain. Herein, in each domain, each of the entities may be configured to perform communication through a reference point (e.g., Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
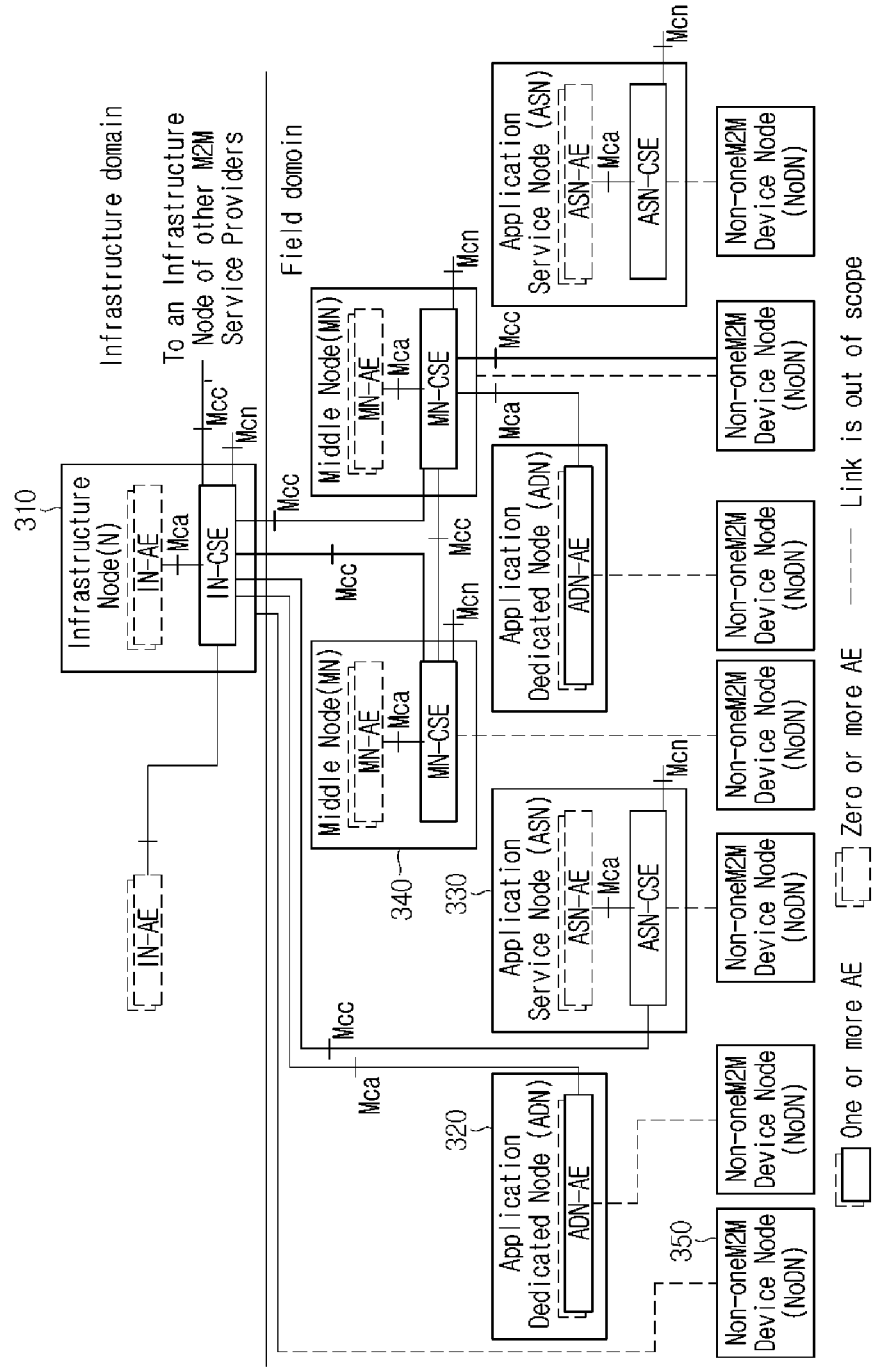
FIG. 3 is a view illustrating each node in an M2M system according to the present disclosure.

FIG. 3 is a view illustrating each node in an M2M system according to the present disclosure.

Referring to FIG. 3, an infrastructure domain of a specific M2M service provider may be configured to provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node configured to perform communication with the M2M terminal of another infrastructure based on an infrastructure structure. In addition, for example, conceptually, a node may be a logical entity or a software configuration.

Furthermore, an application dedicated node (ADN) 320 may be a node including at least one AE but not CSE. Here, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. Particularly, the MN may be set in the field domain. An MN may be connected to another MN or IN based on a reference point. In addition, for example, an MN may be set in an M2M gateway in hardware.

In addition, as an example, a non-M2M terminal node 350 (Non-M2M device node, NoDN) is a node that does not include M2M entities. It may be a node that performs management or collaboration together with an M2M system.

Figure 4:
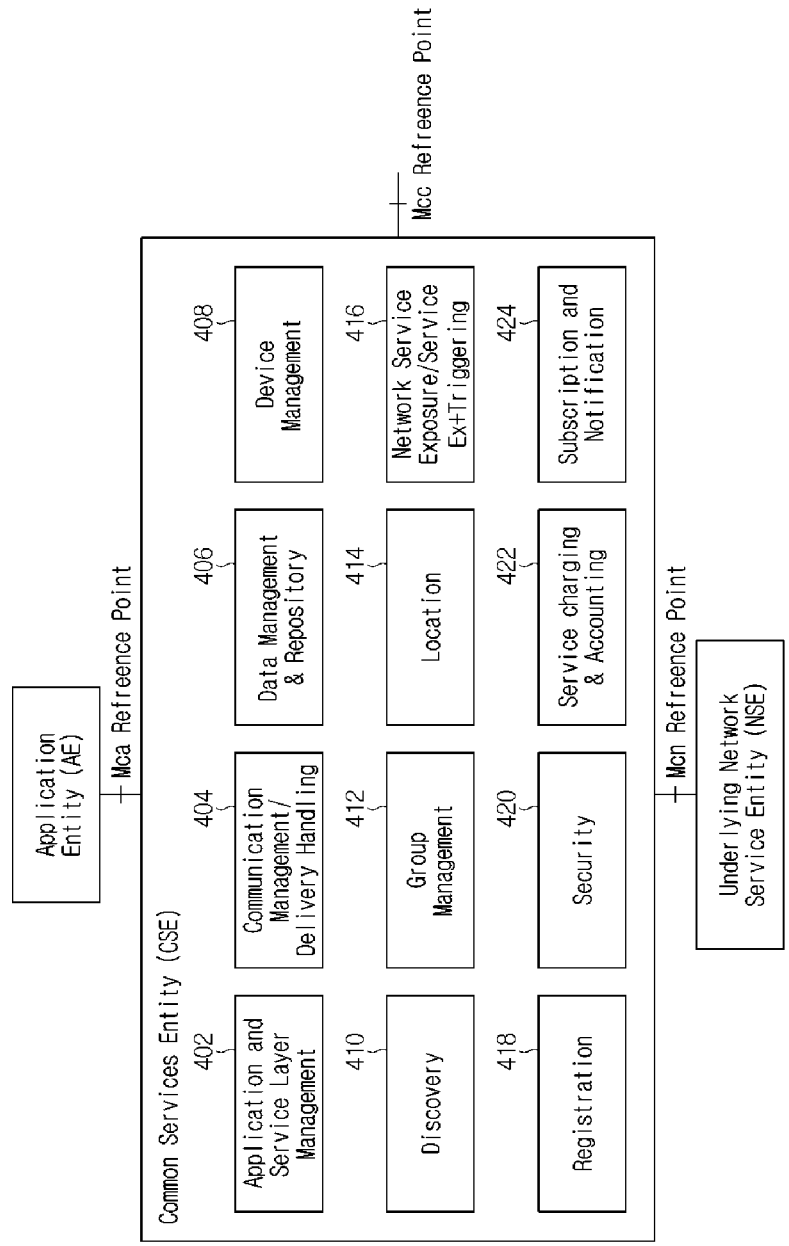
FIG. 4 is a view illustrating a common service function in an M2M system according to the present disclosure.

FIG. 4 is a view illustrating a common service function in an M2M system according to the present disclosure.

Referring to FIG. 4, common service functions may be provided. For example, a common service entity may be configured to provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may be configured to operate based on a common service function. In addition, a common service function may be possible in other exemplary embodiments and is not limited to the above-described exemplary embodiment.

The application and service layer management 402 CSF may be configured to provide management of AEs and CSEs. The application and service layer management 402 CSF includes the configuring, problem solving and upgrading of CSE functions and the capability of upgrading AEs.

The communication management and delivery handling 404 CSF may be configured to provide communications with other CSEs, AEs and NSEs. The communication management and delivery handling 404 CSF may be configured to determine at what time and through what connection communications are to be delivered, and determine to buffer communication requests so that the communications may be delivered later, if necessary and permitted.

The data management and repository 406 CSF may be configured to provide data storage and transmission functions (e.g., data collection for aggregation, data reformatting, and data storage for analysis and sematic processing).

The device management 408 CSF may be configured to provide the management of device capabilities in M2M gateways and M2M devices.

The discovery 410 CSF may be configured to provide an information retrieval function for applications and services based on filter criteria.

The group management 412 CSF may be configured to provide processing of group-related requests. The group management 412 CSF enables an M2M system to support bulk operations for many devices and applications.

The location 414 CSF may be configured to provide a function of enabling AEs to obtain geographical location information.

The network service exposure/service execution and triggering 416 CSF may be configured to manage communications with base networks for access to network service functions.

The registration 418 CSF may be configured to provide a function of registering AEs (or other remote CSEs) to a CSE. The registration 418 CSF allows AEs (or remote CSE) to use services of CSE.

The security 420 CSF may be configured to provide a service layer with security functions like access control including identification, authentication and permission.

The service charging and accounting 422 CSF may be configured to provide charging functions for a service layer.

The subscription/notification 424 CSF may be configured to provide a function of allowing subscription to an event and notifying the occurrence of the event.

Figure 5:
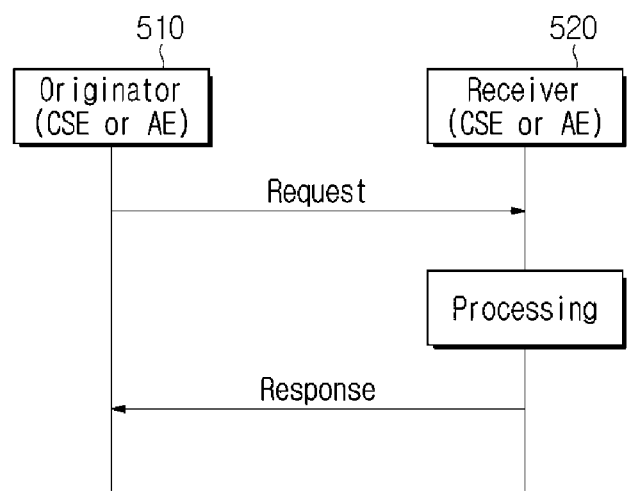
FIG. 5 is a view illustrating that an originator and a receiver exchange a message in an M2M system according to the present disclosure.

FIG. 5 is a view illustrating that an originator and a receiver exchange a message in an M2M system according to the present disclosure.

Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers or gateways, which are described above. In other words, the originator 510 and the receiver 520 may be hardware or software configurations and are not limited to the above-described embodiment.

Additionally, a request message transmitted by the originator 510 may include at least one parameter. Herein, for example, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510.

In addition, a receiving terminal-related parameter may be a parameter for the receiver 520. In addition, an identification parameter may be a parameter required for identification of each other.

An operation parameter may be a parameter for distinguishing operations. For example, an operation parameter may be set to any one among Create, Retrieve, Update, Delete and Notify. In other words, the parameter may aim to distinguish operations.

Particularly, when receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, if a parameter is valid and authorized, the receiver 520 may be configured to check whether there is a requested resource and may perform processing accordingly.

For example, when an event occurs, the originator 510 may be configured transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

Response message parameter/success or not
Response Status Code - successful, unsuccessful, ack
Request Identifier - uniquely identifies a Request message
Content - to be transferred
To - the identifier of the Originator or the Transit CSE that sent the corresponding non-blocking request
From - the identifier of the Receiver
Originating Timestamp - when the message was built
Result Expiration Timestamp - when the message expires
Event Category - what event category shall be used for the response message
Content Status
Content Offset
Token Request Information
Assigned Token Identifiers
Authorization Signature Request Information
Release Version Indicator - the oneM2M release version that this response message conforms to A filter criteria condition, which can be used in a request message or a response message, may be defined as in Table 2 and Table 3 below.

TABLE 2

| Condition tag | Multiplicity | Description |
| --- | --- | --- |
| | | Matching Conditions |
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |

TABLE 2-continued

| Condition tag | Multiplicity | Description |
|---|---|---|
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value, ft also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentSize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentinfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card<br>*. E.g. creator of container resource type can be used as a filter criteria tag as "creator = Sam", "creator = Sam*", "creator = *Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery.<br>In the case of semantic resource discovery targeting a specific resource, if the semantic description contained in the <semanticDescriptor> of a child resource matches the semanticFilter, the URI of this child resource will be included in the semantic resource discovery result.<br>In the case of semantic query, given a received semantic query request and its query scope, the SPARQL query statement shall be executed over aggregated semantic information collected from the semantic resource(s) in the query scope and the produced output will be the result of this semantic query.<br>Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multiplicity | Description |
|---|---|---|
| | | Filter Handling Conditions |
| filterUsage | 0 . . . 1 | Indicates how the filter criteria is used. If provided, possible values are 'discovery' and 'IPEOnDemandDiscovery'.<br>If this parameter is not provided, the Retrieve operation is a generic retrieve operation and the content of the child resources fitting the filter criteria is returned.<br>If filterUsage is 'discovery', the Retrieve operation is for resource discovery (clause 10.2.6), i.e. only the addresses of the child resources are returned.<br>If filterUsage is 'IPEOnDemandDiscovery', the other filter conditions are sent to the IPE as well as the discovery Originator ID. When the IPE successfully |

TABLE 3-continued

| Condition tag | Multiplicity | Description |
|---|---|---|
| | | generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. ../tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

| Request message parameter | |
|---|---|
| Mandatory | Operation - operation to be executed/CREAT, Retrieve, Update, Delete, Notify |
| | To - the address of the target resource on the target CSE |
| | From - the identifier of the message Originator |
| | Request Identifier - uniquely identifies a Request message |
| Operation dependent | Content - to be transferred |
| | Resource Type - of resource to be created |
| Optional | Originating Timestamp - when the message was built |
| | Request Expiration Timestamp - when the request message expires |
| | Result Expiration Timestamp - when the result message expires |
| | Operational Execution Time - the time when the specified operation is to be executed by the target CSE |
| | Response Type - type of response that shall be sent to the Originator |
| | Result Persistence - the duration for which the reference containing the responses is to persist |
| | Result Content - the expected components of the result |
| | Event Category - indicates how and when the system should deliver the message |
| | Delivery Aggregation - aggregation of requests to the same target CSE is to be used |
| | Group Request Identifier - Identifier added to the group request that is to be fanned out to each member of the group |
| | Group Request Target Members-indicates subset of members of a group |
| | Filter Criteria - conditions for filtered retrieve operation |
| | Desired Identifier Result Type - format of resource identifiers returned |
| | Token Request Indicator - indicating that the Originator may attempt Token Request procedure (for Dynamic Authorization) if initiated by the Receiver |
| | Tokens - for use in dynamic authorization |
| | Token IDs - for use in dynamic authorization |
| | Role IDs - for use in role based access control |
| | Local Token IDs - for use in dynamic authorization |
| | Authorization Signature Indicator - for use in Authorization Relationship Mapping |
| | Authorization Signature - for use in Authorization Relationship Mapping |
| | Authorization Relationship Indicator - for use in Authorization Relationship Mapping |
| | Semantic Query Indicator - for use in semantic queries |
| | Release Version Indicator - the oneM2M release version that this request message conforms to. |
| | Vendor Information |

A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE.

An announced resource contains a set of attributes of an original resource. When an original resource changes, an announced resource is automatically updated by the hosting CSE of the original resource. The announced resource contains a link to the original resource.

Resource announcement enables resource discovery. An announced resource at a remote CSE may be used to create a child resource at a remote CSE, which is not present as a child of an original resource or is not an announced child thereof.

In order to support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

Resources may be specified in associated to CSE. Resources are representation of component and element in CSE at oneM2M system. Other CSEs, AEs, application data for sensor and commands are notified to CSE as mean of resource representation. A resource is an entity that is uniquely addressable in oneM2M architecture. Resource is delivered and may be manipulated by CRUD(Create Retrieve Update Delete) operation.

A child resource is a sub-resource of the parent resource. The parent resource may include the reference to at least one child resource. An attribute may contain the information of resource. The set of attributes is not listed within the graphical representation of the resource, unless common to all resources. An attribute may be distinguished as universal attribute, common attribute and resource-specific attribute. The universal attribute is an attribute that appears on all resources. The common attribute is an attribute that appears on multiple resources and has the same meaning wherever it appears.

Table 5 may show the examples of the attributes that are virtual or not announced, general and universal on all resources.

TABLE 5

| Attribute Name | Description |
| --- | --- |
| resourceType | Resource Type. This Read Only (assigned at creation time, and then cannot be changed) attribute identifies the type of the resource as specified in clause 9.6. Each resource shall have a resourceType attribute. |
| resourceID | This attribute is an identifier for the resource that is used for 'non-hierarchical addressing method', i.e. this attribute shall contain the 'Unstructured-CSE-relative-Resource-ID' format of a resource ID as defined in table 7.2-1. This attribute shall be provided by the Hosting CSE when it accepts a resource creation procedure. The Hosting CSE shall assign a resourceID which is unique in that CSE. |
| resourceName | This attribute is the name for the resource that is used for 'hierarchical addressing method' to represent the parent-child relationships of resources. See clause 7.2 for more details. This attribute may be provided by the resource creator. The Hosting CSE shall use a provided resourceName as long as it does not already exist among child resources of the targeted parent resource. If the resourceName already exists, the Hosting CSE shall reject the request and return an error to the Originator. The Hosting CSE shall assign a resourceName if one is not provided by the resource creator. |
| parentID | This attribute is the resourceID of the parent of this resource. The value of this attribute shall be NULL for the <CSEBase> resource type. |
| creationTime | Time/date of creation of the resource. This attribute is mandatory for all resources and the value is assigned by the system at the time when the resource is locally created. Such an attribute cannot be changed. |
| lastModifiedTime | Last modification time/date of the resource. The lastModifiedTime value is set by the Hosting CSE when the resource is created, and the lastModifiedTime value is updated when the resource is updated. |

Table 6 shows examples of attributes that are commonly used in a plurality of resource types(but, not all resource types) that are virtual or not announced.

TABLE 6

| Attribute Name | Description |
| --- | --- |
| accessControlPolicyIDs | The attribute contains a list of identifiers for <accessControlPolicy> resources. The privileges defined in the <accessControlPolicy> resources that are referenced determine who is allowed to access the resource containing this attribute for a specific purpose (e.g. Retrieve, Update, Delete, etc.). For an Update or Delete operation to a resource, the update or delete of the accessControlPolicyIDs attribute, if applicable, shall be performed prior to the update or delete of any other attributes of the resource. To update this attribute, a Hosting CSE shall check whether an Originator has Update privilege in any selfPrivileges, regardless of privileges, of the <accessControlPolicy> resources which this attribute originally references. After successful update of the accessControlPolicyIDs attribute, resource access checking for other attributes to be updated shall use the new privileges defined in the <accessControlPolicy> resource(s) that are referenced by the newly updated accessControlPolicyIDs attribute. Similarly, to delete this attribute, a Hosting CSE shall check whether an Originator has Updateprivilege in any selfPrivileges, regardless of privileges, of the <accessControlPolicy> resources which this attribute originally references. |

TABLE 6-continued

| Attribute Name | Description |
| --- | --- |
| | After successful deletion of the accessControlPolicyIDs attribute, resource access checking for other attributes to be deleted shall use the default access privileges as described in the following paragraphs.<br>If a resource type does not have an accessControlPolicyIDs attribute definition, then the accessControlPolicyIDs for that resource is governed in a different way, for example, the accessControlPolicy associated with the parent may apply to a child resource that does not have an accessControlPolicyIDs attribute definition, or the privileges for access are fixed by the system. Refer to the corresponding resource type definitions and procedures to see how access control is handled in such cases.<br>If a resource type does have an accessControlPolicyIDs attribute definition, but the (optional) accessControlPolicyIDs attribute value is not set in a resource instance, then the Hosting CSE shall apply the concept of the default access policy. The default policy shall provide unrestricted access only to the Originator of the successful resource creation request. All other entities shall be denied to access the resource. For that purpose, the Hosting CSE shall keep that Originator information of the resource. Note that how to keep that information is implementation specific. The default access policy is not applied to a resource which has a value assigned to the accessControlPolicyIDs attribute.<br>All resources are accessible if and only if the privileges (i.e. configured as privileges or selfPrivileges attribute of <accessControlPolicy> resource) allow it, therefore all resources shall have an associated accessControlPolicyIDs attribute, either explicitly (setting the attribute in the resource itself) or implicitly (either by using the parent privileges or the system default policies). Which means that the system shall provide default access privileges in case that the Originator does not provide a specific accessControlPolicyIDs during the creation of the resource. |
| expirationTime | Time/date after which the resource will be deleted by the Hosting CSE. This attribute can be provided by the Originator, and in such a case it will be regarded as a hint to the Hosting CSE on the lifetime of the resource. The Hosting CSE shall configure the expirationTime value. If the Hosting CSE configures the new expirationTime attribute value rather than the Originator suggested value, the new value can be sent back to the Originator depending on the Result Content value. The lifetime of the resource can be extended by providing a new value for this attribute in an UPDATE operation. Or by deleting the attribute value, e.g. by updating the attribute with NULL when doing a full UPDATE, in which case the Hosting CSE can decide on a new value.<br>If the Originator does not provide a value in the CREATE operation the system shall assign an appropriate value depending on its local policies and/or M2M service subscription agreements.<br>A resource is known as 'obsolete' when the resource contains the attribute "expirationTime" and the lifetime of this resource has reached the value of this attribute. If the 'obsolete' resource had a reference to an Application Entity Resource ID, the Hosting CSE shall send a NOTIFY request to the IN-CSE, requesting to delete the entry from the <AEContactList> resource. |
| stateTag | An incremental counter of modification on the resource. When a resource is created, this counter is set to 0, and it will be incremented on every modification of the resource (see notes 1 and 2). |
| announceTo | This attribute may be included in a CREATE or UPDATE Request in which case it contains a list of addresses/CSE-IDs where the resource is to be announced. For the case that CSE-IDs are provided, the announced-to CSE shall decide the location of the announced resources based on the rules described in clause 9.6.26. For the original resource, this attribute shall only be present if it has been successfully announced to other CSEs. This attribute maintains the list of the resource addresses to the successfully announced resources. Updates on this attribute will trigger new resource announcement or de-announcement.<br>If announceTo attribute includes resource address(es), the present document does not provide any means for validating these address(s) for announcement purposes. It is the responsibility of the Hosting-CSE referenced by the resource address(s) to validate the access privileges of the originator of the Request that triggers the announcement. |
| announcedAttribute | This attributes shall only be present at the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| labels | Tokens used to add meta-information to resources. This attribute is optional.<br>The value of the labels attribute is a list of individual labels, each of them being: Either a standalone label-key, used as a simple "tag", that can be used for example for discovery purposes when looking for particular resources that one can "tag" using that label-key<br>Or a composite element made of a label-key and a label-value, separated by a special character defined in [3].<br>The list of allowed characters in a label (and in label-keys and label-values) and separator characters is defined in [3], clause 6.3.3. |
| e2eSecInfo | Present in a resource representing an AE or CSE. Indicates the end-to-end security capabilities supported by the AE or CSE. May indicate supported end-to-end security frameworks. May also contains a certificate or credential identifier used by the AE or CSE. May include random values for use in end-to-end security protocols. |

TABLE 6-continued

| Attribute Name | Description |
| --- | --- |
|  | The details of this attributes are described in oneM2M TS-0003 [2]. This attribute is optional and if not present it means that the represented entity does not support oneM2M end-to-end security procedures. |
| DynamicAuthorizationConsultationIDs | This attribute contains a list of identifiers of <dynamicAuthorizationConsultation> resources. The information defined in a <dynamicAuthorizationConsultation> resource is used by a CSE for initiating consultation-based dynamic authorization requests.<br>Consultation-based dynamic authorization is only performed for a targeted resource if and only if it is linked to an enabled <dynamicAuthorizationConsultation> resource.<br>If the attribute is not set or has a value that does not correspond to a valid <dynamicAuthorizationConsultation> resource(s), or it refers to an <dynamicAuthorizationConsultation> resource(s) that is not reachable, then the dynamicAuthorizationConsultationIDs associated with the parent may apply to the child resource if present, or a system default <dynamicAuthorizationConsultation> may apply if present. |

According to the present disclosure, for privacy protection of protection data in an M2M system, specific data may be indicated as protection data, and information related to the protection data may be configured in such forms as resource, attribute and sub-resource. In this regard, a further detailed description will be provided with reference to FIGS. 6 to 12.

Recently, Gartner, a US-based IT research and advisory company, has forecast that, by virtue of expansion of wireless networks and widespread of smart devices, the number of M2M terminals or M2M entities will exceed about 26 billion, apart from regular person computers, smart phones, and tablet PCs. As M2M technologies are actively utilized for various purposes like medical and health care applications, smart home (or connected home), smart agriculture (factory 4.0 agriculture), and smart aquaculture (aquaculture 4.0), the number of M2M entities is exponentially increasing. Along with the increase in the number of M2M entities, M2M data traffic also necessarily increases including personal and protection data. Like protection data in other systems, protection data in an M2M system should be stably transmitted to a receiver, adequately processed not to be read by any unauthorized person, and safely stored in whatever way. Accordingly, an adequate processing method for privacy protection is also required for M2M data.

Figure 6:
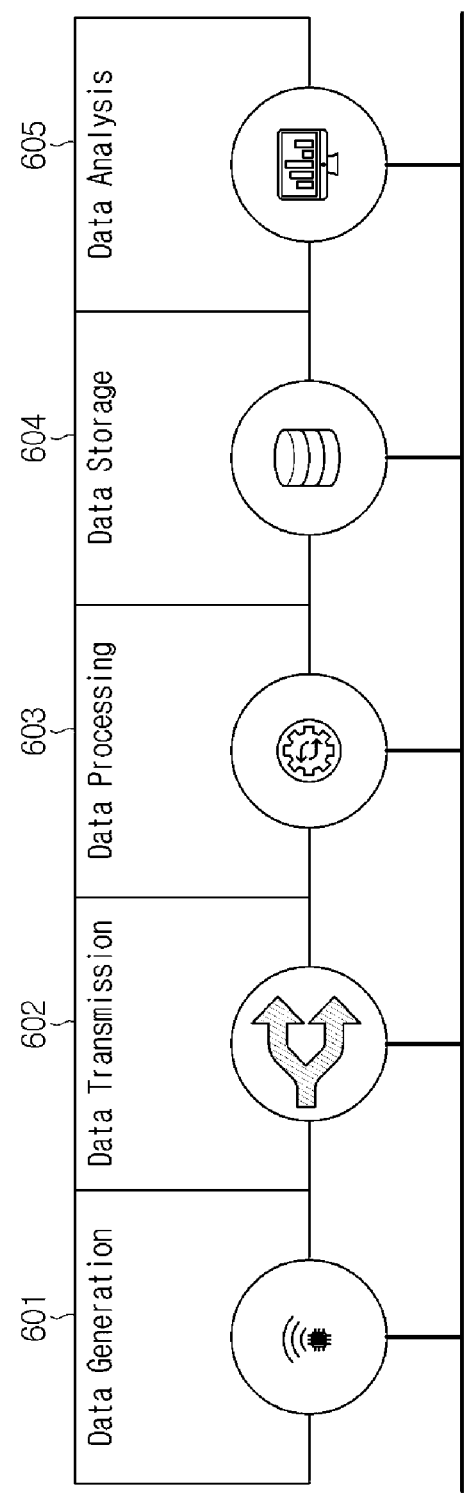
FIG. 6 illustrates a data flow in an M2M system according to the present disclosure.

In order to set a foundation for M2M data privacy protection, a general data flow of an M2M system will be analyzed, and seemingly vulnerable portions regarding the privacy protection of M2M data in each process will be examined. FIG. 6 illustrates a general data flow in an M2M system according to the present disclosure. According to FIG. 6, a general data flow may include data generation 601, data transmission 602, data processing 603, data storage 604, and data analysis 605.

First, an M2M entity may generate data 601. In one embodiment, the data may be information on an M2M entity user and include data that are included in an M2M entity or collected by means of an external sensor connected to the M2M entity. Herein, it may matter whether the generated data are protection and personal data, that is, require privacy protection.

Furthermore, it may also matter whether data collection for generating data is performed for an explicit and legitimate purpose. It may also matter whether data collection itself obtains the consent of a subject of the data. Herein, it may matter how to determine whether the generated data are protection data. In other words, it may matter whether a network administrator or other administrator will classify data, a user like a data subject will manually classify data, or data will be automatically classified by means of an apparatus, software or other system. In addition, it may also matter whether current data are generated based on protection data without the consent of a data subject.

When generated data are transmitted 602, it may matter what type of data transmission will be applied, that is, whether data will be accessible to everyone without limitation (for example, data are provided via the web). In addition, when privacy protection of data is necessary, this process needs to be preceded by a determination concerning which protocol is to be applied.

When data are processed 603, if the data are personal and protection data, it may matter whether the process is sufficiently explained to a receiver of protection data and other entity related to the protection data, what or which portions are the protection data to be pseudonymized or anonymized, and which algorithm is to be applied to which protection data.

When protection data are stored in storage 604, for example, it would be necessary to determine where the data are to be stored. In one embodiment, when protection data are stored in South Korea, the Personal Information Protection Act (PIPA) may apply. For another example, when protection data are stored in an EU country, the General Data Protection Regulation (GDPR) corresponding to PIPA may apply. In addition, it may be necessary to check whether user rights related to protection data of a user are guaranteed. Here, the user rights may include the access to and modification/opposition/restriction of protection data, data transmission, protection data's right to be forgotten, and a right to forget protection data, but are not limited thereto. In addition, it may be necessary to check a current measure for protecting storage where data are stored. Herein, measures for protecting storage may include encryption and archiving but are not limited thereto.

When protection data are analyzed 605, it may be necessary to check first whether a subject of the protection data has consented to another user's analysis of the data.

Hereinafter, for clarity of description, a privacy protection procedure for M2M data will be described based on an arbitrary M2M system capable of implementing the data flow. An M2M system may include an M2M platform (server) and at least one M2M terminal. However, the present disclosure is not limited thereto. As the data flow illustrates a sketchy procedure, it is clear that other M2M apparatus or process may be added or some M2M apparatus and process may be omitted.

Figure 7A:
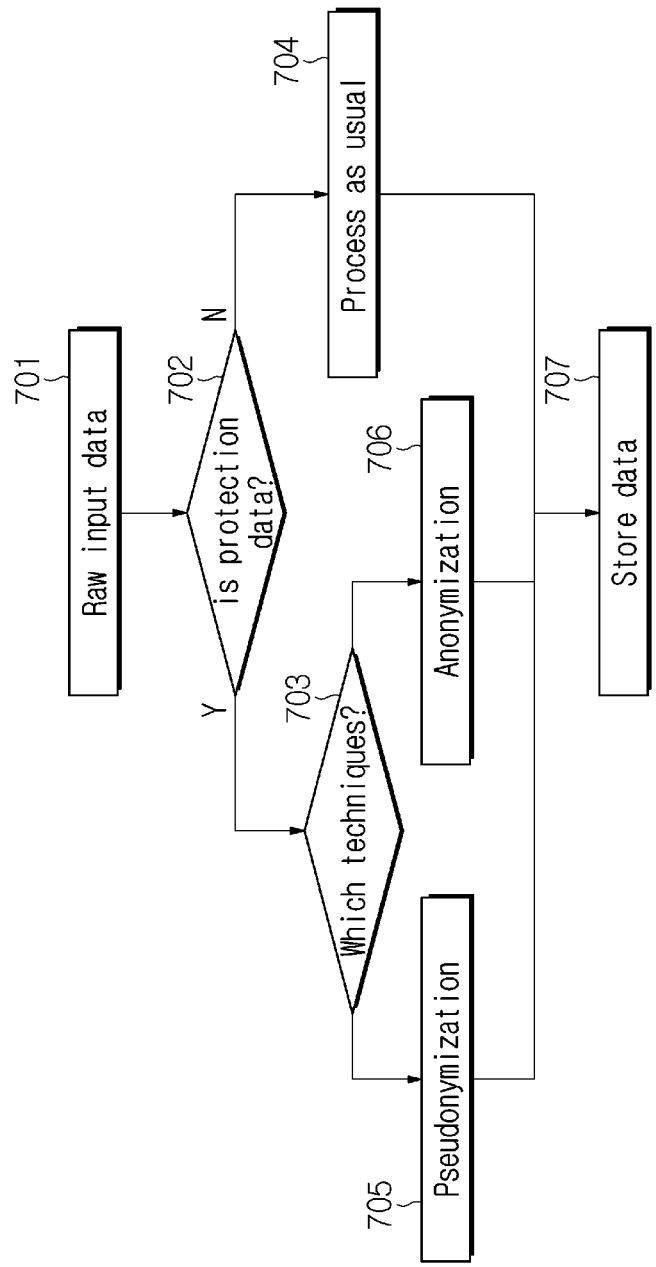
FIG. 7A is a view showing a procedure of processing protection data in an M2M system according to the present disclosure.

FIG. 7A is a view showing a procedure of processing protection data in an M2M system according to the present disclosure. More particularly, FIG. 7A is a view for explaining a procedure for privacy protection of protection data, when data are generated by an M2M terminal, transmitted to an M2M apparatus of an M2M platform and stored in the M2M apparatus.

Meanwhile, as FIG. 7A is a view focusing on a sketchy procedure for processing data requiring privacy protection, a relevant attribute or a resource generation request may be omitted. An example of a further detailed procedure will be described below with reference to FIGS. 8 to 11.

First, in one embodiment, an M2M terminal may generate data (raw input data) 701. In one embodiment, the data may include not only data collected from a sensor included in the M2M terminal and data collected from an external sensor connected to the M2M terminal but also information on the M2M terminal itself and user information of the M2M terminal, that is, information on a subject of sensor data. However, the data are not limited thereto.

Then, the M2M terminal may transmit the data to an M2M apparatus, and the M2M apparatus receiving the data may determine whether the received data are protection data (702). Herein, in one embodiment, an M2M apparatus may receive information on personal data protection laws or a data processing method, which is to be applied when data are protection data, along with data. Alternatively, an M2M terminal may transmit only data, and an M2M apparatus may determine personal data protection laws or a data processing method that is to be applied when data are protection data. Alternatively, the personal data protection laws or the data processing method may have already been determined.

When data received by an M2M apparatus is determined not be protection data, the received data may be processed according to a general data processing procedure (704) and be stored (707).

On the other hand, when the received data are determined to be protection data requiring privacy protection, an M2M apparatus may apply a data processing method for privacy protection of protection data (703). As mentioned above, the method may be determined based on data transmitted by an M2M terminal or be determined as an adequate method by an M2M apparatus according to situations. Alternatively, one data processing method like pseudonymization 705 or anonymization 706 may be applied. Other data processing method may be applied. For the purpose of clarity, the description below will be based on pseudonymization and anonymization, although the present disclosure is not limited thereto.

Pseudonymization 705 is a processing method that decreases identifiability by preventing protection data from belonging to a particular subject without additional information. Here, other additional information may be separately stored under a technical and administrative measure. Specific pseudonymization techniques include heuristic pseudonymization, encryption, data masking, replacement, and blurring, but are not limited thereto. In one embodiment, heuristic pseudonymization is a method of hiding detailed personal information by replacing the values corresponding to identifiers with some predetermined rules or by processing them according to the judgment of the person. For example, replace name information with a generalized name such as James or Sophia, or replace institution information with Korea, the United States, or Earth. This will be done by setting rules in advance. All data is processed in the same way, making it easy for users to use and understand.

Among pseudonymization technique, data masking will be described in more details in FIG. 7B.

Meanwhile, anonymization 706 is a method of removing some elements of data in order to prevent a data subject from being identified. More particularly, it is a processing method for preventing a data subject from being identified by all reasonable means available to a third party including a controller. As for a characteristic of anonymization, it is required that data processing should be irreversible. Anonymization techniques may include K-Anonymity, L-Diversity, T-Proximity (T-Closeness), δ-Disclosure privacy, β-Likeness, and δ-Presence, but are not limited thereto. δ-Disclosure privacy method can also be used to protect data against attribute disclosure. It also enforces a restriction on the distances between the distributions of protection values but uses a multiplicative definition which is stricter than the definition used by t-closeness. β-Likeness method is related to t-closeness and δ-disclosure privacy and it can also be used to protect data against attribute disclosure. It aims to overcome limitations of prior models by restricting the relative maximal distance between distributions of protection attribute values, also considering positive and negative information gain. Detailed data processing methods according to the above-mentioned anonymization techniques will be described in more details with reference to FIGS. 7C to 7H.

Adequately processed data for privacy protection may then be stored in an M2M apparatus (707). Such data may be stored in a resource and an attribute, which will be described in more details with reference to FIGS. 8 to 11.

Meanwhile, in the above description, protection data were stored after being processed. However, this is only one embodiment. Protection data may be stored in an M2M apparatus without being processed. Then, when another M2M entity requests the stored protection data, data processing may be performed and the processed data may be delivered. This process will be described in more details with reference to FIG. 10A and FIG. 10B.

Figure 7H:
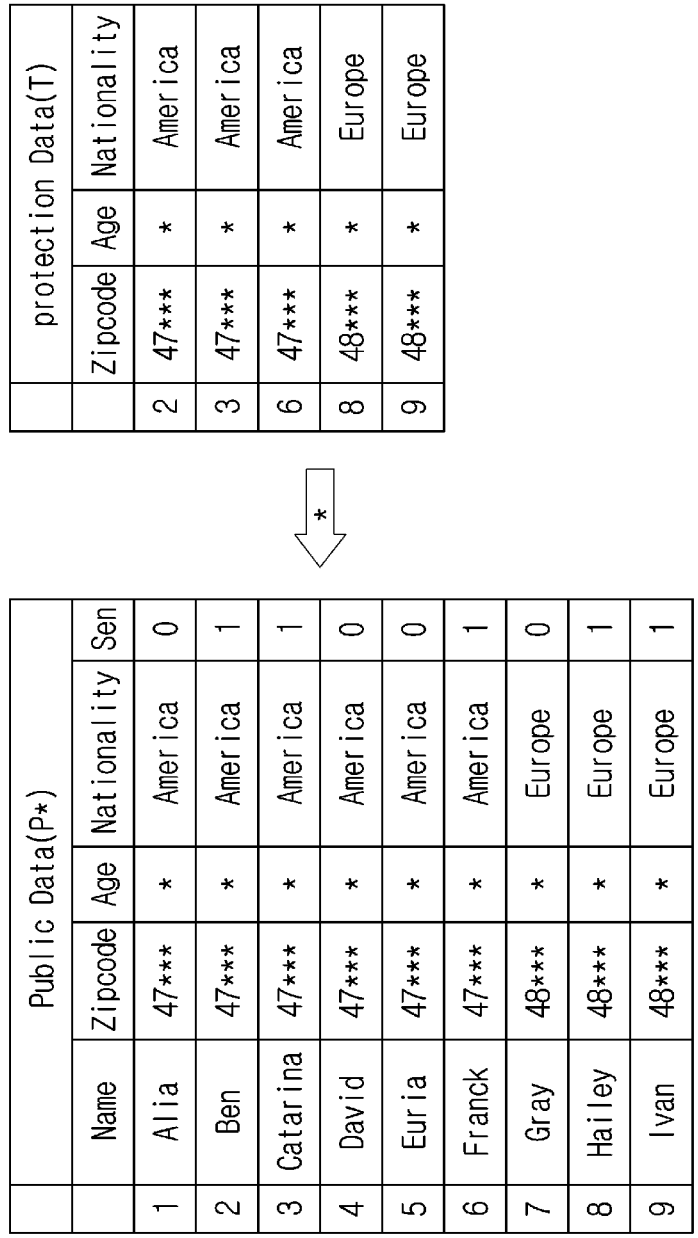

FIGS. 7B to 7H are views showing detailed processing techniques according to the present disclosure. More particularly, FIG. 7B is a view for explaining data masking, FIG. 7C is a view for explaining K-Anonymity, FIG. 7D is a view for explaining L-Diversity, and FIG. 7E is a view for explaining T-Closeness. FIGS. 7F to 7H are views for explaining δ-Presence.

FIG. 7B is a view showing a result of applying the data-masking method to the protection data in an M2M system. The standard for pseudonymization is known as data masking. By replacing protection data with virtual but realistic data, it helps reduce data risks while preserving data utilities. Examples of data masking are shown in the table of FIG. 7B. In one embodiment, one system stores both the name and the card number of people. The name, 'James' and his card number data 711, and the name, 'Davis' and his card number data 712 are stored in the system. In this case, the name, 'James' is changed to 'Schmidt', and the card number data is also changed to the new random card number data by the same rules as the actual card number data(xxxx-xxxx-xxxx-xxxx). The new, random card number data may be configured differently from the actual card number data of James' and the same procedure may be repeated to 'Davis'. Masked data shall not break application integrity. It shall meet the same business rules as real data (e.g., masked ages are still in the same age group. The zip code has the same geographic variance. Credit card checksums are correctly calculated to ensure that the application running for masked data is performed as if the masked data are real and that there is no limit to the user's ability to use the application appropriately.).

FIG. 7C is a view showing a result of applying the K-anonymity method to the protection data in an M2M system. K-anonymity allows the same value to exist at least k in a given data set so that it is not easily combined with other information. A part of the data set is modified and all records have k-1 or more records that are identical to (not distinguished) themselves. Linking cannot be performed with confidence >1/k. Protection attributes are not considered in this model. Normally k-anonymity can be implemented by generalization and suppression. The generalization technique is to replace attribute values with more generalized values. The K-anonymity is satisfied by converting the value of each attribute to a value on a more generalized domain.

For example, in the data set given as FIG. 7C, k is 2, and includes protection data for the age, gender, and zip code of the data subject. There are two data (721, 722) for 42-year-old women with the same leading digit as 5, and there are two data (724, 725) about 32-year-old men whose first three digits of the zip code are the same. In this case, by applying a generalization technique that replaces the attribute values of the K-anonymity algorithm with generalized values, the age data can be converted to a value from a generalized domain (eg, 40-49 years) rather than a specific value (eg, 42 years old). The greater the generalization, the more easily the k-anonymity will be met, but if the data table is modified too severely, no useful information will be available.

Suppression means removing values from the information table completely; suppression removes all attribute of the cell, so more information is lost when compared to generalization. Remove all details, so only suppression is applied to major characteristics; data suppression does not result in a dangerous attack. It can be applied to row level column levels and to entire cells.

FIG. 7D is a view showing a result of applying the L-diversity method to the protection data in an M2M system. This privacy model is that records that are de-identified together in a given data set have at least 1 different protection information (in the same set). It defends attacks by homogeneity attacks and background knowledge, which are two attacks on k-anonymity. This model constitutes a equivalence class with sufficiently diverse (more than 1) protection information in the de-identification process. The table in FIG. 7D is an example of medical data that are de-identified by the 3-diversity model. Sensitivity information, the disease name is mixed enough to protect against attacks.

In one embodiment, it is assumed that there are data sets for age, gender, postal code, and disease information for 6 persons (731, 732, 733, 734, 735, 736). In addition, only disease information is designated as protection data, L is set to 2, age domain (0-40, 40-80), gender domain (female, male), zip code domain (02*, 53*) is set. Accordingly, six data may be classified as group 1(7311), group 2(7312), and group 3(7313) using age, gender, and postal code data. Each group will have at least 2 (L) different protection data (in this case disease information). As a result, disease information, which is protection data, can be safely protected.

FIG. 7E is a view showing a result of applying the T-closeness method to the protection data in an M2M system. This privacy method can also be used to protect data from attribute disclosure. It requires that the distributions of values of a protection attribute within each equivalence class must have a distance of not more than t to the distribution of the attribute values in the input dataset.

Even if the k-anonymity and 1-diversity are satisfied, if the protection information distribution of the combination is different from the distribution of the other combinations, the protection information is leaked due to the distribution difference. The idea is to make two distances less than the threshold t. In this case, the method used to calculate the distance between the two distributions uses the Earth Mover's Distance (EMD) used in statistics.

The T-closeness method defines excessive differences in the distribution between the equivalence class and the entire data set as a weakness of the 1-diversity method and prevents similar values from pooling.

In one embodiment, it is assumed that there is a data set containing age, gender, postal code, disease and salary data for six people. In this case, if the data set is divided into group 1 (741, 742), group 2 (743, 744), and group 3 (745, 746), The 741 and 742 data corresponding to group 1 have similarities to each other compared to the distribution of overall salary (30 to 110). If classified into the same group, approximate salaries can be inferred, and people in that group can be found vulnerable to gastrointestinal diseases. To prevent this, applying the T-closeness model, it can be divided into groups 1 (7411, 7412), group 2 (7413, 7414) and group 3 (7415, 7416). In addition, in order to prevent protection data with high similarity from pooling, it may be necessary to reduce the difference in data distribution in the same group. In the group 1, 2, and 3, the difference in the distribution of salary data within the same group is 60 for group 1, 50 for group 2, and 50 for group 3, so the difference is not significant, thereby preventing the risk of data leakage.

The 7411, 7412 part of the table is a homogeneous set. Since the distribution of salaries is 30 to 90, there is no significant difference from the entire distribution of salaries (30-110). Diarrhea items also make it difficult to infer certain diseases.

FIG. 7F to 7H is a view showing a result of applying the δpresence method to the protection data in an M2M system.

This processing method can be used to protect data from membership disclosure. A dataset is (δmin, δmax)-present if the probability that an individual from the population is contained in the dataset lies between δmin and δmax. In order to be able to calculate these probabilities, users need to specify a population table.

Given an external (public) background knowledge P, and a private table T; δ=(δmin, δmax)-presence holds for a generalization T* of T if δmin≤Pr(t∈T|T*,P)≤δmax for every t ∈P.

How can we generalize δ-Presence from the table in FIG. 7F? A generalization T* of T is a nonoverlapping generalization with respect to P if—every tuple in P can be mapped onto at most one equivalence class in T*, as FIG. 7G.

Let T* be a non-overlapping generalization of T with respect to P. Then T* in FIG. 7H is δ-present, if for each equivalence class of the corresponding P*:

δmin≤(#of 1 s in Sen.)/|ec|≤δmax

The values in the above tabel are Pr(t a δT|T*)=0.5 and Pr(t g ∈T|T*)=0.66.

Figure 8:
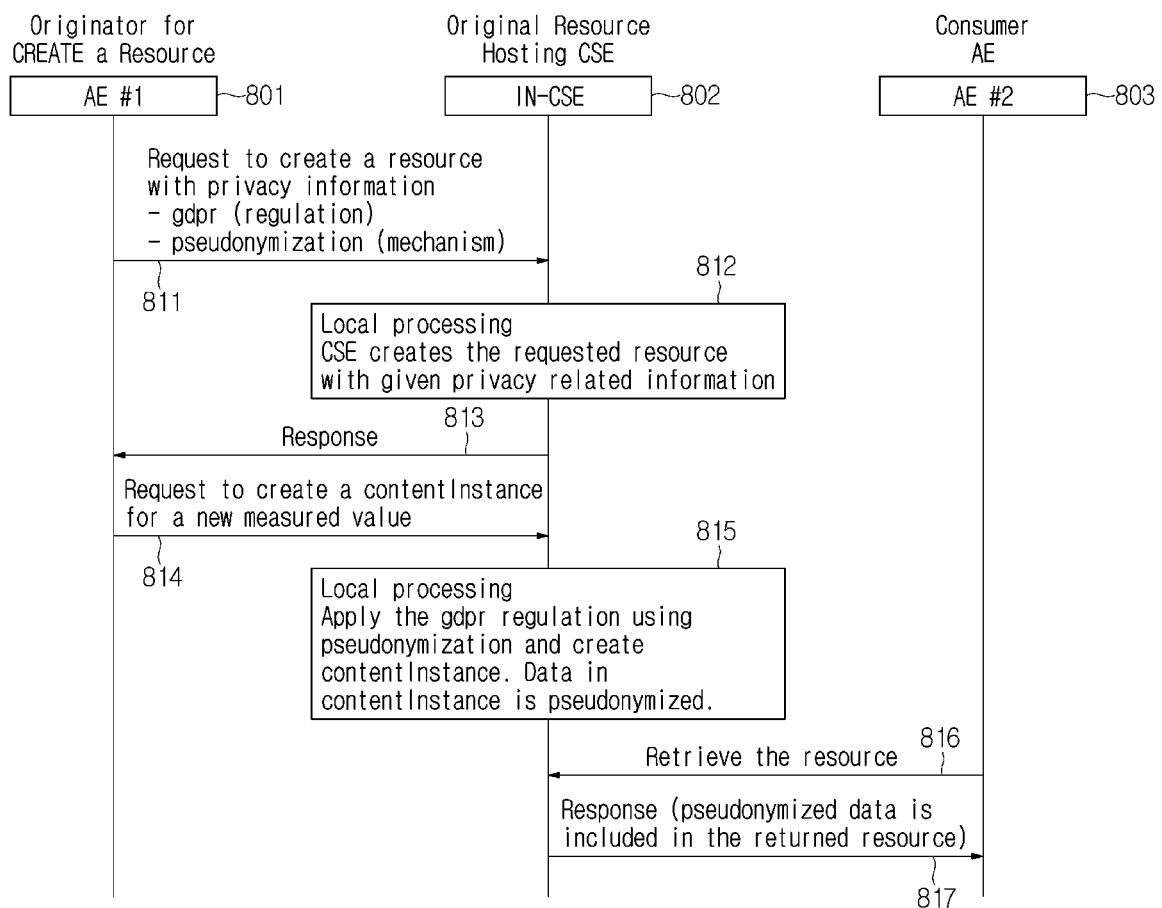
FIG. 8 is a view showing a procedure of processing protection data in an M2M system according to the present disclosure.

FIG. 8 is a view showing a procedure of processing protection data in an M2M system according to the present disclosure. As mentioned above, an M2M system may include at least one or more M2M terminals and an M2M apparatus of an M2M platform (server). The M2M terminals may correspond to AE #1 801 and AE #2 803 respectively, and the M2M apparatus may correspond to an infrastructure node-common service entity (IN-CSE) 802.

In one exemplary embodiment, for clarity of description, AE #1 801, IN-CSE 802 and AE #2 803 of FIG. 8 are assumed to be implemented as respective M2M devices. However, implementation is not limited thereto. For example, AE #1 and AE #2 may be implemented as separate processes in a single M2M device or implemented as a single process while being distinguished in software. However, implementation is not limited thereto.

In one exemplary embodiment, AE #1 801 may be an M2M terminal. Herein, as mentioned above, data may include information on a user of an M2M terminal or data collected by a sensor included in an M2M terminal. AE #1 801 may request generation of a resource for data administration to IN-CSE 802 (811). In this case, information including personal data protection laws or a data processing method to be applied to protection data may be transmitted to IN-CSE 802. As mentioned above, FIG. 8 shows that information on protection data is determined by an M2M terminal. However, this is an exemplary embodiment. Accordingly, IN-CSE 802 may determine such information, and there may be other embodiments. A data processing method, for example, may be pseudonymization or anonymization. Hereinafter, as an exemplary embodiment, it is assumed that GDPR is applied as personal data protection laws and pseudonymization is applied as a data processing method.

After receiving a request of generating a resource for data administration, IN-C SE 802 may generate the requested resource (812). In one exemplary embodiment, a generated resource may be <contentInstance> or <container>. It may be a resource for administering data of an M2M terminal. In addition, personal data protection laws and a data processing method included in information for protection data may be indicated by <privacyRegulation> and <privacyProcessingRule> respectively. This will be described in more details with reference to FIG. 11. Meanwhile, in the description below, a resource generated at a request is assumed to be <container>.

When a resource is completely generated, this may be notified to AE #1 801 (813). After recognizing the completion of resource generation, AE #1 801 may request generation of a resource in which data are to be stored, while transmitting the data to IN-CSE (814). When receiving the data, IN-CSE 802 determines whether the data are protection data. When the data are determined to be protection data, IN-CSE 802 may apply personal data protection laws like GDPR by applying pseudonymization as a data processing method to the protection data (815). Such data may be stored in the resource that is generated for data storage. Herein, the resource that is generated for data storage may be the resource <contentInstance>. Protection data in the resource <contentInstance> may be pseudonymized by IN-CSE 802. Thus, privacy may be protected.

Then, AE #2 803, a third-party M2M entity, may request the resource storing protection data to IN-CSE 802 (816). It is because each M2M terminal or each M2M application may share data and the data may be the protection data. Receiving the request, IN-CSE 802 may transmit the resource including pseudonymized data to AE #2 803 as it is. When AE #2 803 is an unauthorized entity having no prior consultation with AE #1 801 regarding access to protection data, AE #2 803 is not capable of determining what are the pseudonymized data. Thus, the privacy of the data may be clearly protected.

Meanwhile, FIG. 8 illustrates that data are stored in the resource after being pseudonymized or anonymized through data processing. However, this is one exemplary embodiment. On the other hand, data may be stored in the resource as they stand. When a third-party M2M entity (AE #2) requests the resource including the data, it may be determined whether the data are protection data. If the data are determined as protection data, data processing may be performed to deliver the resource. In this regard, a further detailed description will be provided in FIG. 10A and FIG. 10B.

Figure 9:
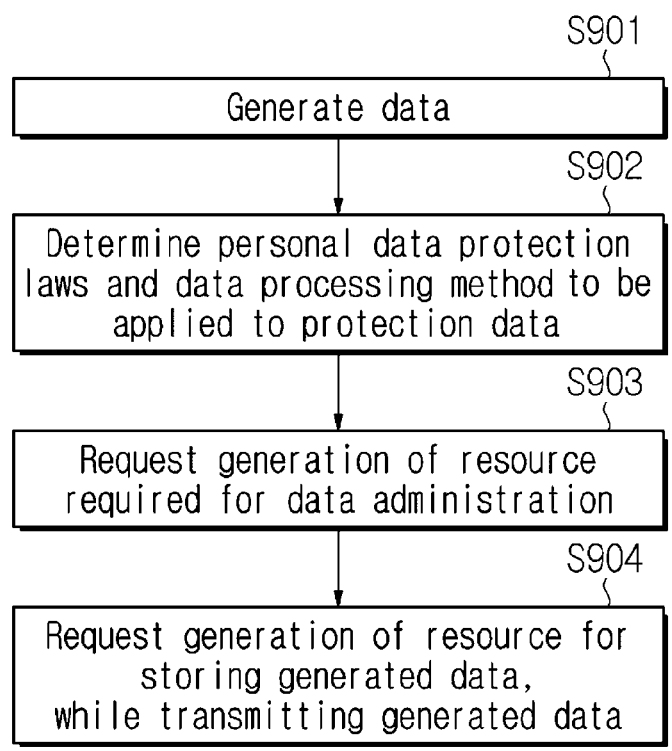
FIG. 9 is a view showing a procedure of processing protection data of an M2M terminal in an M2M system according to the present disclosure.

FIG. 9 is a view showing a procedure of processing protection data through an M2M terminal in an M2M system according to the present disclosure.

In one embodiment, an M2M terminal may generate data (S901), determine personal data protection laws and a data processing method to be applied to protection data (S902), request generation of a resource for data administration (S903), and request generation of a resource for storing the generated data while transmitting the generated data (S904).

In one embodiment, data that are generated during the generation of data (S901) may be information regarding a user of an M2M terminal. For example, the data may include a user name, a user ID and the like. In addition, the data may include data collected from a sensor included in an M2M terminal or an external sensor connected to an M2M terminal. For example, the data may include body temperatures, pulse rates, and daily paces of a person collected from a sensor included in an M2M terminal. However, this is one exemplary embodiment, and there may be other exemplary embodiments.

Then, when the generated data are protection data requiring privacy protection, an M2M terminal may determine personal data protection laws and a data processing method to be applied (S902). Particularly, a data processing method is directed for protecting data privacy and may include pseudonymization and anonymization that are mentioned above. However, it is not limited thereto.

In one embodiment, an M2M terminal may request generation of a resource required for data administration (S903). Such a resource generation request may be received by an M2M apparatus and include a request for generating a resource structure including an attribute required for data administration. Herein, an M2M terminal may transmit a resource generation request along with information including personal data protection laws and a data processing method to an M2M entity including an M2M apparatus and a third-party M2M terminal. Particularly, whether data to be received from the M2M terminal are protection data and which personal data protection laws is to be applied may be marked and administered as attributes in a resource for administering data. This will be described in further details with reference to FIG. 10A, FIG. 10B and FIG. 11.

Then, an M2M terminal may send out the generated data and request generation of a resource for storing the generated data (S904). Particularly, the resource for storing the generated data may mean a resource in which data generated by being collected from an M2M terminal will be actually stored.

Meanwhile, FIG. 9 shows that an M2M terminal determines a data processing method and personal data protection laws for protection data. However, it is one exemplary embodiment. Accordingly, the data processing method and the personal data protection laws may also be determined by an M2M apparatus of an M2M platform.

Figure 10A:
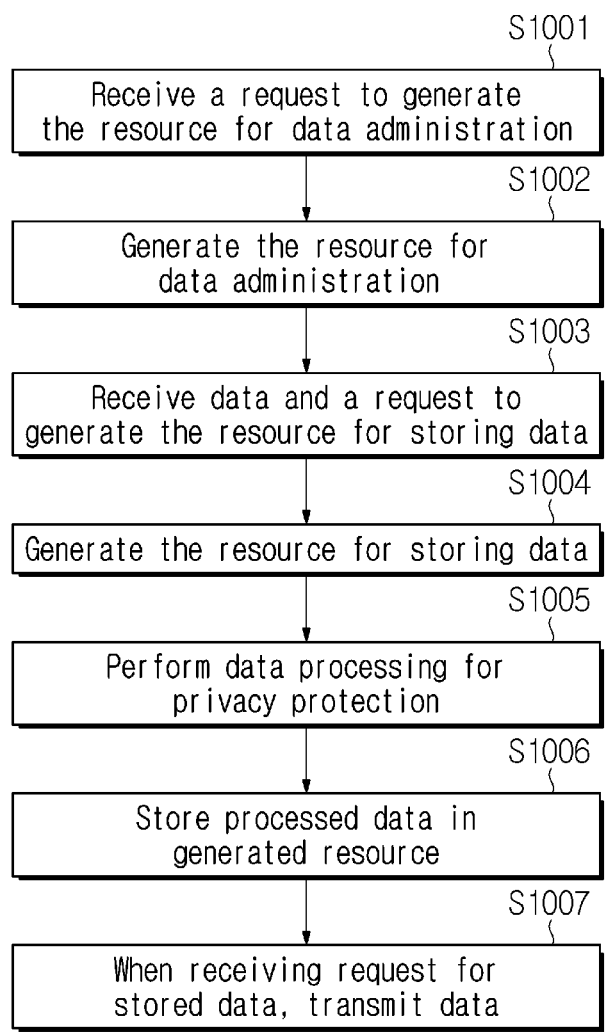
FIG. 10A and FIG. 10B are views showing a procedure of processing protection data of an M2M apparatus in an M2M system according to the present disclosure.
Figure 10B:
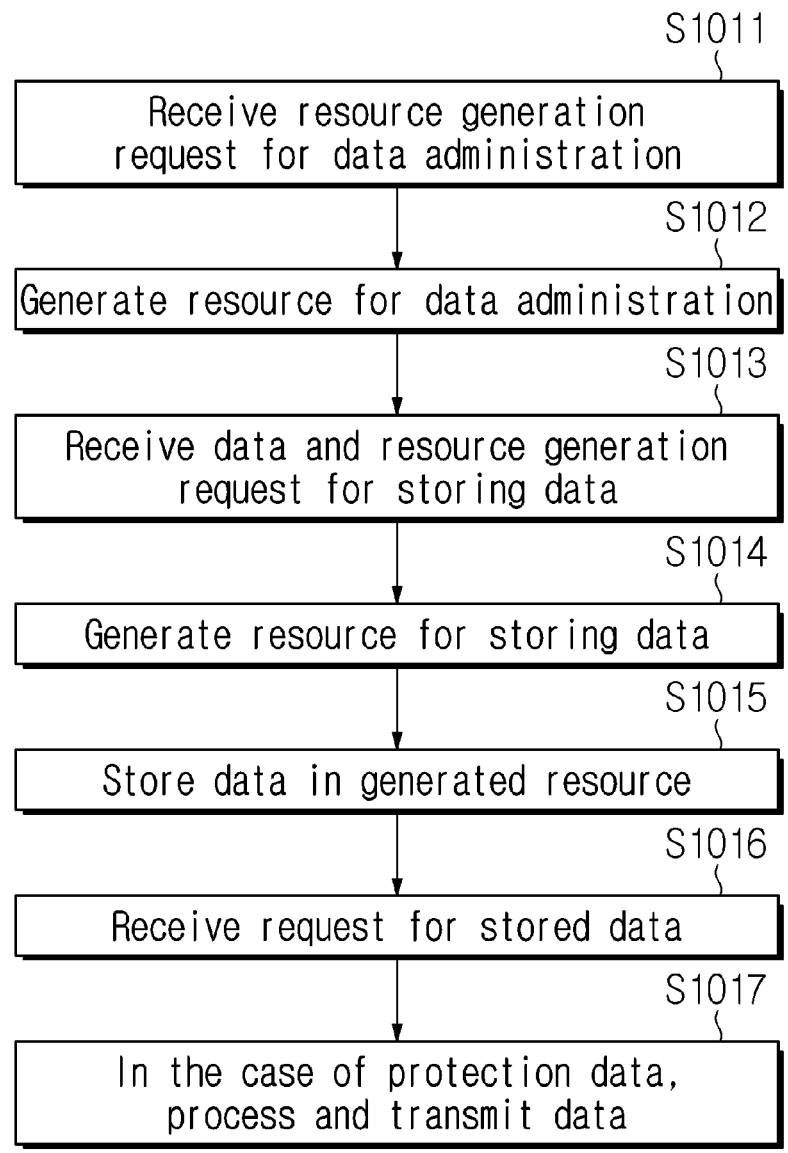

In FIGS. 10A, 10B and 11 below, a method by an M2M apparatus of an M2M platform for receiving data from an M2M terminal and processing the data will be described in details. For clarity of description, an M2M terminal is assumed to have gone through the procedure of FIG. 9. However, the present disclosure is not limited thereto.

FIGS. 10A and 10B are views illustrating an operating procedure of an M2M apparatus in an M2M system according to the present disclosure. More particularly, FIGS. 10A and 10B are views illustrating an operating procedure of an M2M apparatus for receiving and processing protection data that are transmitted from an M2M terminal according to FIG. 9.

In one exemplary embodiment, an M2M apparatus may be an apparatus existing in an M2M platform in an M2M system. It may correspond to a common services entity infrastructure node (IN-CSE) of FIG. 9. An M2M terminal may correspond to AE #1 of FIG. 9.

According to an exemplary embodiment shown in FIG. 10A, an M2M apparatus may receive a resource generation request for data administration (S1001). In one embodiment, such a resource generation request may be transmitted an M2M apparatus and include a request for generating a resource structure including an attribute required for data administration. In addition, along with a resource generation request for data administration, information on data to be generated in an M2M terminal may be received. When data generated in an M2M terminal are protection data, information on data to be generated in the M2M terminal may include personal data protection laws to be applied or a data processing method for privacy protection. Thus, an M2M apparatus may generate a resource for data administration (S1002). In one exemplary embodiment, the resource thus generated may be <container> but is not limited thereto. Also, in one exemplary embodiment, a resource for data administration may include the attribute <privacyIndication> showing whether current data are protection data, the attribute <privacyRegulation> indicating personal data protection laws applied to the protection data, and the attribute <privacyProcessingRule> representing a data processing method to be applied for privacy protection, but is not limited thereto. In addition, an attribute may record information on generated data received from an M2M terminal. Another example of attribute to be included in the resource may be described in more details with reference to FIG. 11.

Then, data generated by being collected from an M2M terminal and a request of generating a resource, in which the data will be stored, may be received (S1003). Particularly, the received data may be the same as the generated data mentioned in FIG. 9. In particular, the resource in which data will be stored may mean a resource in which data actually received from an M2M terminal will be stored and may be different from a resource required for administering data that are generated earlier.

Accordingly, when the resource in which data will be stored is generated (S1004), data processing for privacy protection may be performed (S1005). In one embodiment, a resource in which data are to be stored may be <contentInstance> but is not limited thereto. Further, in one embodiment, as mentioned above, a data processing method may be included in information that is preset by an M2M terminal and is transmitted by the same along with protection data. On the other hand, a data processing method may be determined by an M2M apparatus.

In particular, data processing for privacy protection may be performed for data received from an M2M terminal but may not be performed for all the received data. Data processing may be performed for only protection data. In this regard, before performing data processing (S1005), it may be determined whether privacy protection is required for data received from an M2M terminal. In other words, whether received data are protection data may be determined first. In one embodiment, whether data are protection data may be determined based on an attribute of the data and a characteristic of an M2M terminal. Further, in one exemplary embodiment, a data processing method may be pseudonymization or anonymization that are mentioned above. More particularly, data replacement, personalized anonymization, scrambling, blurring, and data masking may be included, as described in FIGS. 7A to 7H.

In one embodiment, when received data are determined as protection data and data processing is performed, the data may be stored in a generated resource (S1006). The resource may be a resource generated in the step S1004. For example, it may be <contentInstance>.

Then, when there is a request for reading and transmitting data stored in an M2M entity including other application entity, the data may be transmitted (S1007). In this case, the data may be transmitted in a processed state so that the privacy of the data may be protected.

Meanwhile, according to another exemplary embodiment shown in FIG. 10B, an M2M apparatus may receive a resource generation request for data administration (S1011), generate a resource for data administration (S1012), receive data and a request for generating a resource in which the data are to be stored (S1013), generate a resource in which the data are to be stored (S1014), and then store the data in the generated resource (S1015). Then, when a request for the stored data is received from a third-party M2M entity (S1016), the data may be processed and transmitted to the third-party M2M entity (S1017). All the steps herein may be the same as shown in FIG. 10A, unless described contrary to FIG. 10B. On the other hand, unlike the embodiment of FIG. 10A where data determined as protection data are processed for privacy protection and then are stored in a resource, in the embodiment of FIG. 10B, after data are stored in a generated resource as they stand, when a request for data reading and transmission is received from another M2M entity, it may be determined whether the stored data are protection data, and if the data are determined as protection data, the data may be processed and transmitted to a receiver. Meanwhile, although the embodiment of FIG. 10B has a different order of steps from FIG. 10A, each step of FIG. 10B may have the same implementation as a corresponding step of FIG. 10A.

FIG. 11 is a view showing an attribute related to protection data in an M2M system according to the present disclosure. An attribute shown in FIG. 11 may be added to another attribute that is generally used or to a resource (e.g., <container> or <containerInstance>) for administering and storing data of an M2M terminal. In addition, an attribute shown in FIG. 11 is an exemplary embodiment, and some attributes may be omitted or further attributes may be added. Accordingly, the present disclosure is not limited to this embodiment.

The attribute <privacyRegulation> 1101 may indicate a private information protection act to be applied to protection data. For example, as mentioned above, GDPR or PIPA may be indicated by the attribute.

The attribute <privacyIndication> 1102 may indicate that the current data are protection data and need to be protected by personal data protection laws. However, the role of this attribute may be replaced by the attribute <privacyRegulation> or another attribute.

The attribute <privacyProcessingRule> 1103 may indicate a data processing technique to be applied to protection data. For example, the data processing technique may include pseudonymization and anonymization mentioned above and a general technique for protecting data privacy.

The attribute <privacyTechnique> 1104 is an attribute for further specifying the attribute <privacyProcessingRule> and may exactly indicate which type of data processing techniques are applied. For example, the attribute may indicate data replacement, scrambling, masking, personalized anonymization, and blurring. This is the same as described in FIGS. 7A to 7H above.

When a portion of data is related to privacy or corresponds to protection data, the attribute <privacyBlock> 1105 may exactly indicate the portion. It is because the whole data need not to be processed for privacy protection but the portion is to be differently treated. For example, in the case of data described as 'Alice-Info-394872', the portion 'Allice-Info' contains the name of the data subject and may correspond to protection data. Accordingly, the ten characters corresponding to 'Alice-Info' may require data processing for privacy protection. As the attribute <privacyBlock> indicates information on the beginning and end of data to be processed and the number of data characters to be processed, data processing may be performed for a portion of data.

The attribute <privacySubject> 1106 may indicate which part of a resource is subject to personal data protection laws. For example, when an address (URI) of a resource is generated based on information on a subject of data, the address of the resource may also be an object to which personal data protection laws are to be applied. A resource name or contents may be an object to which personal data protection laws are to be applied.

Figure 12:
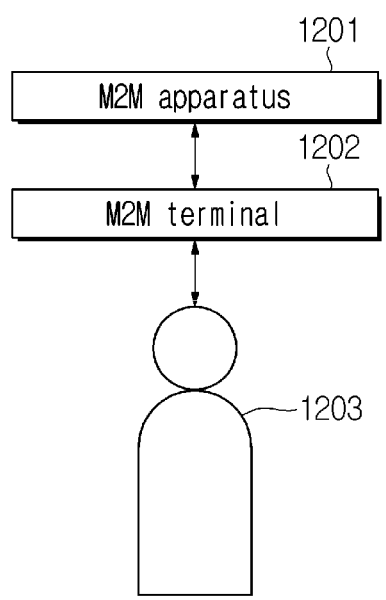
FIG. 12 is a view for explaining one scenario of processing protection data in an M2M system according to the present disclosure.

According to the above-described embodiments of the present disclosure, privacy of protection data may be protected. The embodiments may be applied to various scenarios. FIG. 12 is a view for explaining one exemplary scenario of processing protection data in an M2M system according to the present disclosure.

In one exemplary embodiment, it is assumed that a user A 1203 in France measures her/his body temperature using a wearable M2M terminal 1202 including a temperature sensor and then rature using a wearable M2M terminal 1202 including a temperature sensor and then stores data including the measured temperature in an M2M apparatus 1201 located in an M2M platform (server).

Meanwhile, for an M2M service provided by a wearable M2M device, a resource including a memory, a networking resource and a computing resource may be allocated. Since an address of resource thus newly generated (that is, a uniform resource identifier (URI)) is intended for an M2M service of the user A, it may be generated based on protection data like the user A's ID or name. In other words, an address or name of a generated resource may also require data privacy protection.

In one exemplary embodiment, when the user A measures a body temperature using a wearable M2M device, data may be generated which include the name, ID and body temperature of the user A. In addition, both a name of an allocated resource and data stored in the resource may be objects of personal data protection laws. In this case, since the user A lives in France and data are likely to be stored in France, GDPR may apply. In addition, not only the user A but also an administer and a provider of an M2M service may be supposed to comply with GDPR.

In one exemplary embodiment, an M2M apparatus and an M2M terminal may process data of the user A in the way described in FIGS. 8 to 11.

In addition, information including a data processing method for privacy protection and personal data protection laws to be applied may be administered as a resource and attribute for an M2M service. This is the same as described above.

Figure 13:
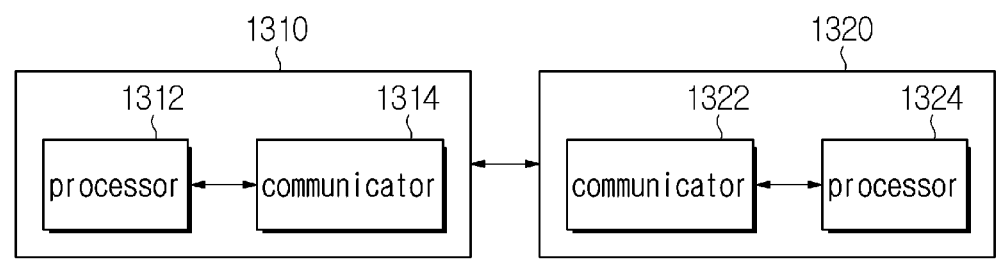
FIG. 13 is a view illustrating a configuration of an M2M apparatus in an M2M system according to the present disclosure.

FIG. 13 is a view illustrating a configuration of M2M devices in an M2M system according to the present disclosure. The M2M device 1310 or the M2M device 1320 illustrated in FIG. 13 may be understood as hardware functioning as at least one among the above-described AE, CSE and NSE.

Referring to FIG. 13, the M2M device 1310 may include the processor 1312 configured to operate a device and the communicator 1314 configured to transmit and receive a signal. In particular, the processor 1312 may be configured to operate the communicator 1314. In addition, the M2M device 1310 may be configured to perform a communication with another M2M device 1320. Another M2M device 1320 may also include the processor 1324 and the communicator 1322, and the processor 1324 and the communicator 1322 may be configured to perform the same function as the processor 1312 and the communicator 1314.

In one embodiment, the communicator 1314, 1322 may be a transmitter, or a receiver, or a transceiver and used interchangeably with a communication unit.

For example, the originator and the receiver, which are described above, may be one of the M2M devices 1310 and 1320 of FIG. 13, respectively. In addition, the devices 1310 and 1320 of FIG. 13 may be different devices. For example, the devices 1310 and 1320 of FIG. 13 may be communication devices, vehicles or base stations. In other words, the devices 1310 and 1320 of FIG. 13 refer to devices, configured to perform a communication, and are not limited to the above-described exemplary embodiments.

Effects obtained in the present disclosure are not limited to the above-mentioned effect, and other effects not mentioned above may be clearly understood by those skilled in the art from the following description.

In the exemplary system described above, processes are described as a series of steps or blocks based on a flowchart, aspects of the present invention are not limited to the illustrated order or sequence. Some steps may be processed in a different order or may be processed substantially simultaneously. Further, it will be understood that the illustrated steps in a flowchart do not necessarily exclude other steps, other steps may be included and one or more steps in a flowchart may be omitted without departing from the spirit and scope of the present invention.

The above description is to explain the technical aspects of exemplary embodiments of the present invention, and it will be apparent to those skills in the art that modifications and variations can be made without departing from the spirit and scope of the present invention. Thus, it is intended that the present invention cover the modifications and variations of this invention provided they come within the scope of the appended claims and their equivalents.

The above-described exemplary embodiments of the present invention may be implemented by various means. For example, the embodiments of the present invention may be implemented by hardware, firmware, software, non-transitory computer-readable medium on which a software or command is stored and executable on a device or a computer, or a combination thereof.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. A machine-to-machine (M2M) apparatus located in an M2M platform in an M2M system, the apparatus comprising:
   a communicator configured to transmit and receive a signal; and
   a processor configured to control the communicator,
   wherein the processor generates a resource for data administration in response to a resource generation request for administering data received by the communicator,
   generates a resource for storing the data in response to a resource generation request for storing the data received by the communicator, wherein the resource for storing the data is different from the resource for data administration,
   determines whether the data received by the communicator are data requiring protection,
   when the data are determined as data requiring protection, performs data processing for privacy protection for the data received by the communicator, and
   store the data performed processing for privacy protection by using the resource for storing the data,
   wherein the resource generated at the resource generation request for administering the data comprises and attribute, privacyRegulation, configured to indicate personal data protection laws to be applied to data requiring protection and an attribute, privacyProcessingRule, configured to indicate a data processing method.

2. The M2M apparatus of claim 1, wherein the communicator receives information comprising personal data protection laws to be applied to data requiring protection and a data processing method.

3. The M2M apparatus of claim 1, wherein the resource generated at the resource generation request for administering the data is a container resource type.

4. The M2M apparatus of claim 1, wherein the resource generated at the resource generation request for storing the data is a contentInstance resource type.

5. The M2M apparatus of claim 1,
   wherein the resource generated at the resource generation request for administering the data further comprises:
   an attribute, privacyTechique, configured to indicate a detailed technique of the data processing method;
   an attribute, privacyBlock, configured to indicate a portion of the received data corresponding to data requiring protection;
   an attribute, privacyIndication, configured to indicate that personal data protection laws is to be applied to the received data; and
   an attribute, privacySubject, configured to indicate which part of the resource for storing the data is subject to the personal data protection laws.

6. The M2M apparatus of claim 1, wherein the data processing method is one of pseudonymization and anonymization.

7. An machine-to-machine (M2M) terminal in an M2M system, the terminal comprising: a communicator configured to transmit and receive a signal; and
   a processor configured to control the communicator;
   wherein the processor generates data requiring protection, determines personal data protection laws and a data processing method to be applied to the data requiring protection,
   requests generation of a resource required for administering the data, and
   requests generation of a resource for storing the generated data while transmitting the data requiring protection, wherein the resource for storing the data is different from the resource for data administration,
   wherein the resource generated at the resource generation request for administering the data comprises an attribute, privacyRegulation, configured to indicate the personal data protection laws to be applied to the data requiring protection and an attribute, privacyProcessingRule, configured to indicate the data processing method.

8. The M2M terminal of claim 7, wherein, when requesting the generation of the resource required for administering the data, the processor transmits information comprising the determined personal data protection laws and the determined data processing method.

9. The M2M terminal of claim 7,
   wherein the resource generated at the resource generation request for administering the data further comprises:
   an attribute, privacyTechique, configured to indicate a detailed technique of the data processing method;
   an attribute, privacyBlock, configured to indicate a portion of the received data corresponding to the data requiring protection;
   an attribute, privacyIndication, configured to indicate that personal data protection laws are to be applied to the received data; and
   an attribute, privacySubject, configured to indicate which part of the resource for storing the data is subject to the personal data protection laws.

10. The M2M terminal of claim 7, wherein the data processing method is one of pseudonymization and anonymization.

11. The M2M terminal of claim 7, wherein the generated data are generated based on data collected from a sensor of the M2M terminal.

12. The M2M terminal of claim 7, wherein the resource generation request for administering the data comprises a request of generating a container resource type.

13. The M2M terminal of claim 7, wherein the resource generation request for storing the data comprises a request of generating a contentInstance resource type.

14. A method for operating an machine-to-machine (M2M) apparatus located in an M2M platform in an M2M system, the method comprising:
    receiving a resource generation request for data administration;

generating a resource for data administration in response to the resource generation request for data administration;

receiving data and a resource generation request of storing the data;

generating a resource for storing the data in response to the resource generation request of storing the data, wherein the resource for storing the data is different from the resource for data administration; and determining whether the received data are data requiring protection, performing, data processing for privacy protection for the received data in response to determining the data as data requiring protection; and storing the data performed processing for privacy protection by using the resource for storing the data, wherein the resource generated at the resource generation request for administering the data comprises an attribute, privacyRegulation, configured to indicate personal data protection laws to be applied to data requiring protection and an attribute, privacyProcessingRule, configured to indicate a data processing method.

* * * * *